United States Patent
Gao et al.

(10) Patent No.: US 10,442,690 B2
(45) Date of Patent: Oct. 15, 2019

(54) AIR FILTER ASSEMBLY

(71) Applicant: PTI Technologies, Inc., Oxnard, CA (US)

(72) Inventors: Michael L. Gao, Oxnard, CA (US); Kanwar Suri, Porter Ranch, CA (US)

(73) Assignee: PTI Technologies, Inc., Oxnard, CA (US)

( * ) Notice: Subject to any disclaimer, the term of this patent is extended or adjusted under 35 U.S.C. 154(b) by 0 days.

(21) Appl. No.: 16/230,418

(22) Filed: Dec. 21, 2018

(65) Prior Publication Data

US 2019/0135631 A1    May 9, 2019

Related U.S. Application Data

(63) Continuation of application No. 15/222,512, filed on Jul. 28, 2016, now Pat. No. 10,160,647.

(60) Provisional application No. 62/313,898, filed on Mar. 28, 2016.

(51) Int. Cl.
| | |
|---|---|
| *B03C 3/00* | (2006.01) |
| *B01D 53/02* | (2006.01) |
| *A61L 9/00* | (2006.01) |
| *A62B 7/08* | (2006.01) |
| *C01B 13/10* | (2006.01) |
| *B01D 53/75* | (2006.01) |
| *B01D 53/86* | (2006.01) |
| *B64D 13/06* | (2006.01) |
| *B01D 53/88* | (2006.01) |

(52) U.S. Cl.
CPC .............. *C01B 13/10* (2013.01); *B01D 53/75* (2013.01); *B01D 53/8675* (2013.01); *B01D 53/885* (2013.01); *B64D 13/06* (2013.01); *B01D 2257/106* (2013.01); *B01D 2258/06* (2013.01); *B64D 2013/0651* (2013.01); *B64D 2013/0685* (2013.01); *C01B 2201/62* (2013.01)

(58) Field of Classification Search
CPC .... B01D 46/0023; B01D 47/06; B01D 53/76; B01D 53/007
USPC ........ 422/5, 120, 168, 305–306; 96/15, 108; 454/228; 95/90, 273
See application file for complete search history.

(56) References Cited

U.S. PATENT DOCUMENTS

| | | | |
|---|---|---|---|
| 8,273,162 B2* | 9/2012 | Pagano | B01D 53/0407 4/218 |
| 2008/0087168 A1* | 4/2008 | Wright | B01D 53/22 96/134 |
| 2008/0170971 A1* | 7/2008 | Bergeron | A61L 9/205 422/171 |
| 2010/0101413 A1* | 4/2010 | Jones | B01J 20/3295 95/141 |

* cited by examiner

*Primary Examiner* — Monzer R Chorbaji
(74) *Attorney, Agent, or Firm* — Brinks Gilson & Lione; Ryan L. Marshall; Jonathan Hartley

(57) ABSTRACT

A compact lightweight air filtration system is disclosed. The air filtration system includes a hydrophobic particulate/coalescing filter and a cleanable ozone converter housed in a housing with an inlet and an outlet. Air flowing from the inlet to the outlet passes through the particulate/coalescing filter element and then the cleanable ozone converter to remove particulates, aerosols, liquids, and ozone.

17 Claims, 7 Drawing Sheets

AIR FILTER ASSEMBLY

RELATED APPLICATIONS

The present application is a continuation of U.S. patent application Ser. No. 15/222,512, filed Jul. 28, 2016, which claims the benefit under 35 U.S.C. § 119(e) of U.S. Provisional Patent Application No. 62/313,898, filed Mar. 28, 2016, which are hereby incorporated by reference.

BACKGROUND

1. Technical Field

Embodiments of the invention relate to air filtration and more particularly to air filtration with integrated particulate filtering, coalescing, and cleanable/reusable ozone conversion properties.

2. Background Information

Aircraft cabins may contain hundreds of passengers crowded into a small space for an extended period of time. The air within the aircraft cabin may be polluted to various degrees by dust, pollens, lint, and smoke. The air is often recycled, such that a portion of the air is returned to the cabin and mixed with fresh air.

To reduce the amount of pollutants, the cabin air is recirculated through filters to reduce the amount of pollutants. Additionally, fresh air is provided from an external source to supplement the recirculated air. Commercial aircraft cabins and flight decks typically recirculate approximately 50% of the cabin air and add approximately 50% fresh air from the external source. The external source of air assures that the recirculated portion does not endlessly recirculate, but is diluted and replaced with outside air.

In addition to pollutants, there are other treatments that may be applied to the air. For instance, oil mist may be present in the recirculated air or the fresh air, which should be removed before supplying the air to the cabin. Furthermore, ozone may be present at elevated concentrations in the atmosphere. Supplying the cabin with air high in ozone content may irritate the passengers breathing or cause other health risks.

Ideally, cabin air should be substantially free of particulate, oil mist, and ozone for the benefit of cabin passengers. To this end, airlines are currently equipped with filtrations systems and coalescing filters for removing oil mist. Additionally, newer airlines may include ozone removal systems to lower the ozone levels in the cabin.

In addition to cabin air, there are other systems in an aircraft that require filtered air low levels of ozone. For example, the fuel tanks of modern aircraft include fuel inerting systems for reducing the risk associated with an explosion of the fuel in the tank. These systems may work by replacing spent fuel with an inert gas such as nitrogen. While nitrogen is readily available from the ambient atmosphere, it is mixed with oxygen that must be removed to obtain an inert gas. This may be done through the use of an air separation module, as commonly known to one of skill in the art. The air separation module requires a source of filtered air substantially free of particulates, oil, liquids, and ozone to extend the efficiency and life of the module.

While each of the described systems are generally effective for their intended purposes, extra space and weight add to fuel costs and reduce the amount of fare paying cargo that an airline may transport. Therefore, each system may not be the optimal size, or other compromises may be made to reduce the weight or size.

It would be beneficial to treat cabin air in a manner that was at least as effective as the described systems, while minimizing the cost, size, and weight of the systems required to treat the cabin air.

BRIEF SUMMARY

In one aspect a filter assembly is disclosed. The filter assembly includes a housing, a particulate/coalescing element, and a cleanable ozone converter. The particulate/coalescing is disposed in the housing and includes a hydrophobic filtration media. The ozone cleanable converter is disposed in the housing and includes a passageway have a catalytic interface surface. The filter assembly has a flow path through the housing that includes flowing through the particulate/coalescing element and then through the cleanable ozone converter before exiting the housing.

In some embodiments, the housing includes a manifold having an inlet and an outlet, and a filter bowl removably coupled to the manifold. In some embodiments the housing is cylindrical. In some embodiments, the flow path flows from the manifold inlet into the particulate/coalescing element and from the cleanable ozone converter into the manifold outlet.

In some embodiments, the filter assembly further includes a drain plug in a bottom of the manifold. In some embodiments, the manifold has an inner flange sized to receive the cleanable ozone converter and an outer flange sized to receive the filter element. In some embodiments, the manifold outlet extends to a central location of the manifold. In some embodiments, a V-band secures the filter bowl to the manifold.

DETAILED DESCRIPTION

In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Figure 1:
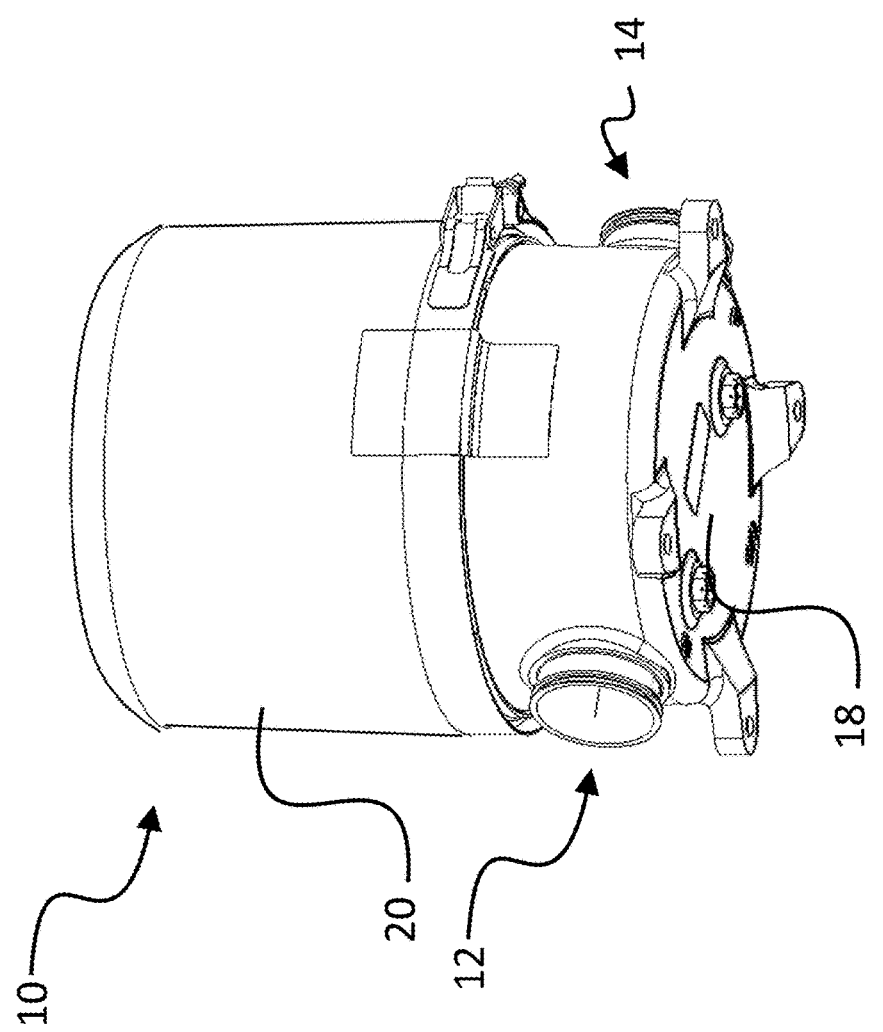
FIG. 1 illustrates an embodiment of an air filtration system.

FIG. 1 illustrates an external view of an air filtration system 10. The air filtration includes an inlet 12 for receiving a supply of untreated air, and an outlet 14 for delivering treated air. Between the inlet 12 and the outlet 14, the air filtration system 10 has three stages for treating a flow of air between the inlet 12 and the outlet 14. The first stage removes liquids from the air, the second stage removes particulates and aerosols, and the third stage removes ozone from the filtered air. The air filtration system 10 includes a housing comprising a manifold 18 having the inlet 12 and outlet 14, and a filter bowl 20 for covering the internal components.

Figure 2:
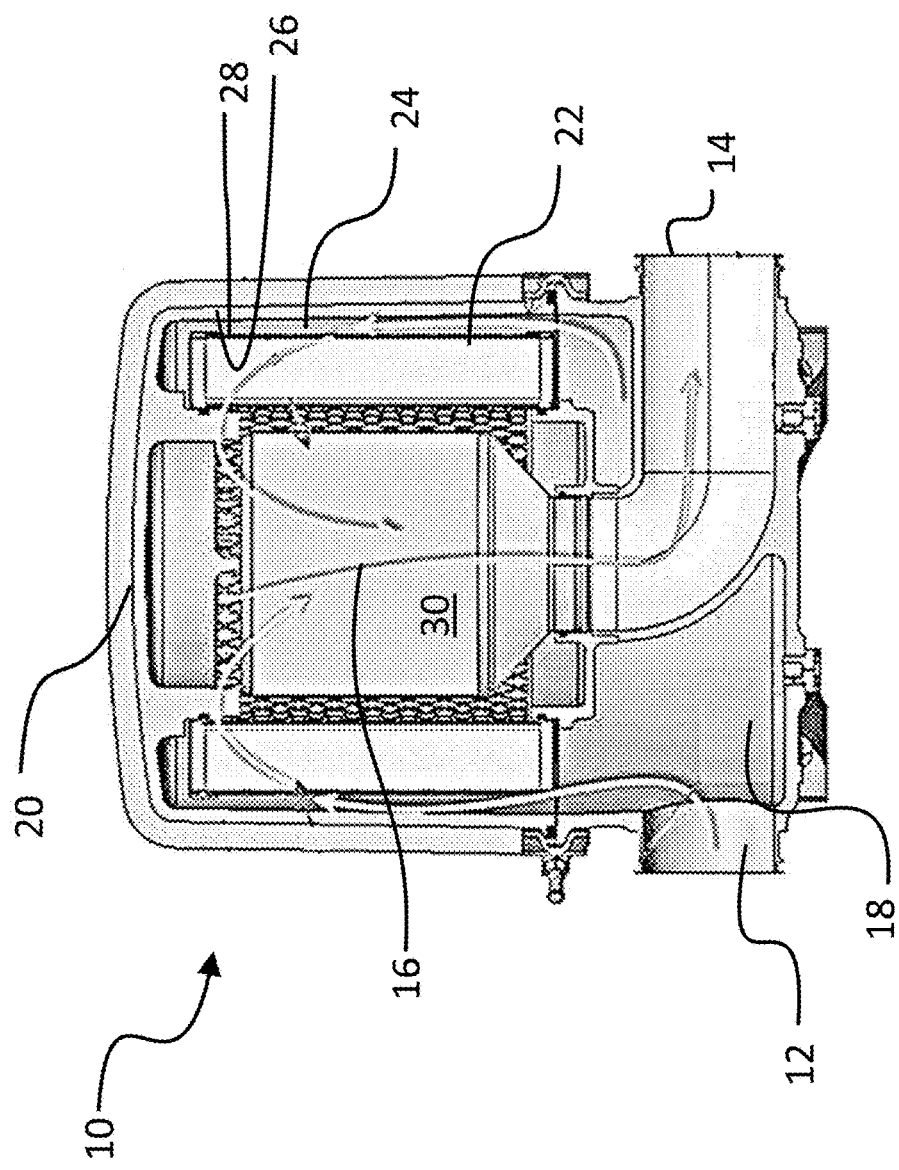
FIG. 2 illustrates a cross section of the embodiment of FIG. 1.

FIG. 2 illustrates a cross section of the air filtration system 10 of FIG. 1. Arrows 16 signify a path for the flow of air from the inlet 12 to the outlet 14. In operation, the air first flows into the manifold 18 where it is directed into the filter bowl 20. Within the filter bowl 20 is a filter element 22 and an annular space 24 which is defined by an interior surface 26 of the filter bowl 20 and an exterior surface 28 of the filter element 22. The air flows from the manifold 18 and into the annular space 24, enveloping the filter element 22.

From the annular space 24, the air flows through the filter element 22, where stage 1 and stage 2 of the filtration process removes liquids, particulates, and aerosols. From the filter element 22, the air passes through a cleanable ozone converter 30 and back into the manifold 18, where it is directed out through the outlet 14.

Figure 3:
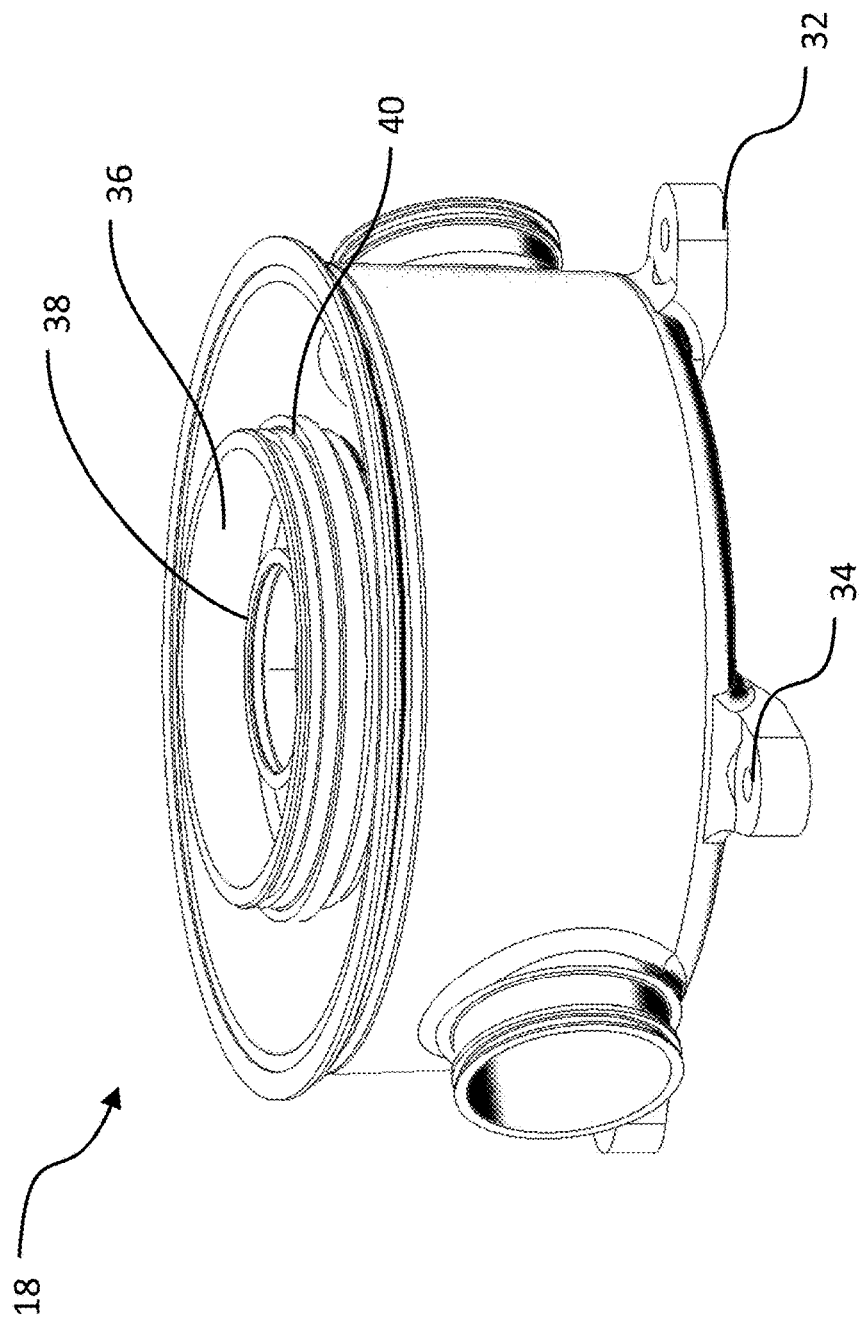
FIG. 3 illustrates a manifold for the air filtrations system of FIG. 1.

FIG. 3 illustrates the manifold 18 of FIG. 2, separate from the other components of the air filtration system 10. The manifold 18 has protrusions 32 at a base end having through holes 34 for mounting the manifold 18. The manifold 18 is circular in shape and has a centrally located ring 36 configured to receive the cleanable ozone converter 30 and the filter element 22. The centrally located ring 36 has an inner flange 38 configured to receive a base of the cleanable ozone converter 30, and an outer flange 40 configured to receive a base of the filtering element 22.

Figure 5:
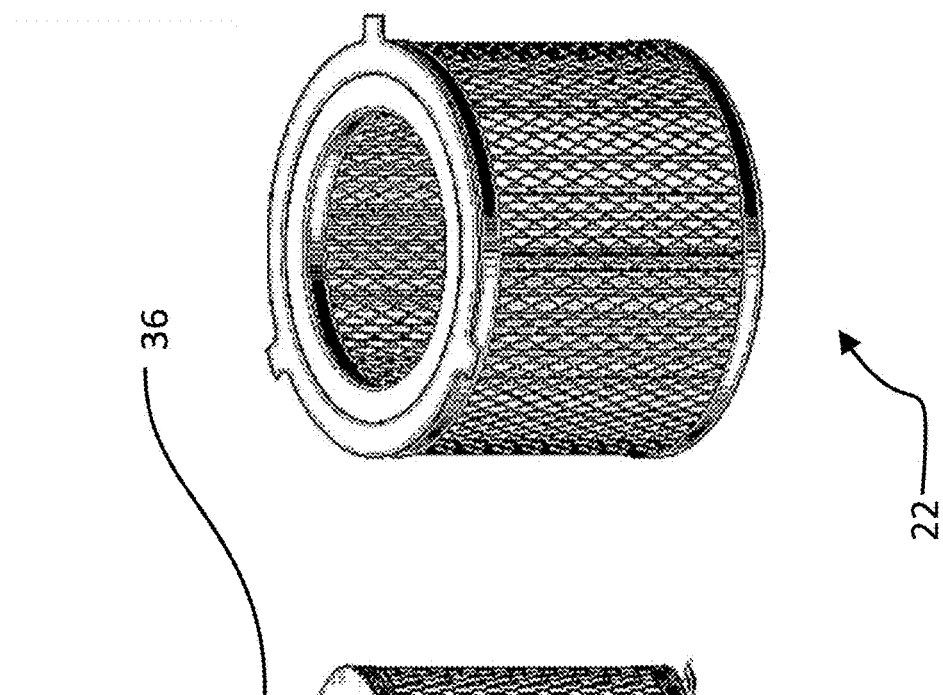
FIG. 5 illustrates a bottom view of the filter element for the air filtration system of FIG. 1.
Figure 4:
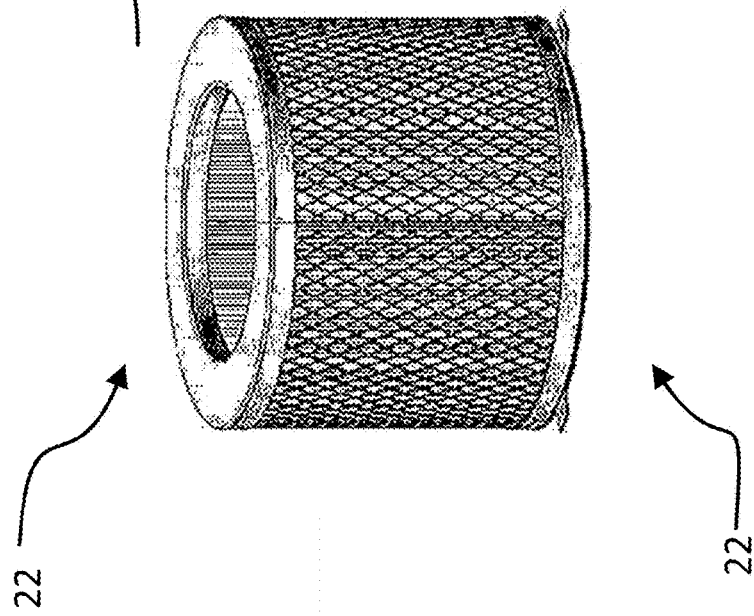
FIG. 4 illustrates a top view of a filter element for the air filtrations system of FIG. 1.

FIG. 4 illustrates a top end of the filter element 22 separate from the remaining components of the air filtration system 10. FIG. 5 illustrates a bottom end of the filter element 22 separate from the remaining components of the air filtration system 10. The filter element 22 comprised of a porous, multilayer sheet of material that is folded into pleats and formed in a cylinder. The top of the cylinder is sized to fit in a protrusion of the filter bowl, while the base is sized to engage the outer flange 40 of the manifold 18. Thus, when assembled, the filter element 22 is held in place at the top end by the protrusion and at the bottom end by the outer flange 40. Air is only able to enter pass from the annular space 24 into the outlet of the manifold 18 by passing through the filter element 22.

In some embodiments, the base of the filter element 22 and/or the top of the filter element 22 may be formed of an elastic material suitable for forming a seal between the outer flange 40 and the protrusion of the filter bowl. In some embodiments, a gasket may be used between sealing surfaces of the filter bowl and the filter element 22 and/or the manifold 18 and the filter element. 22

Figure 6:
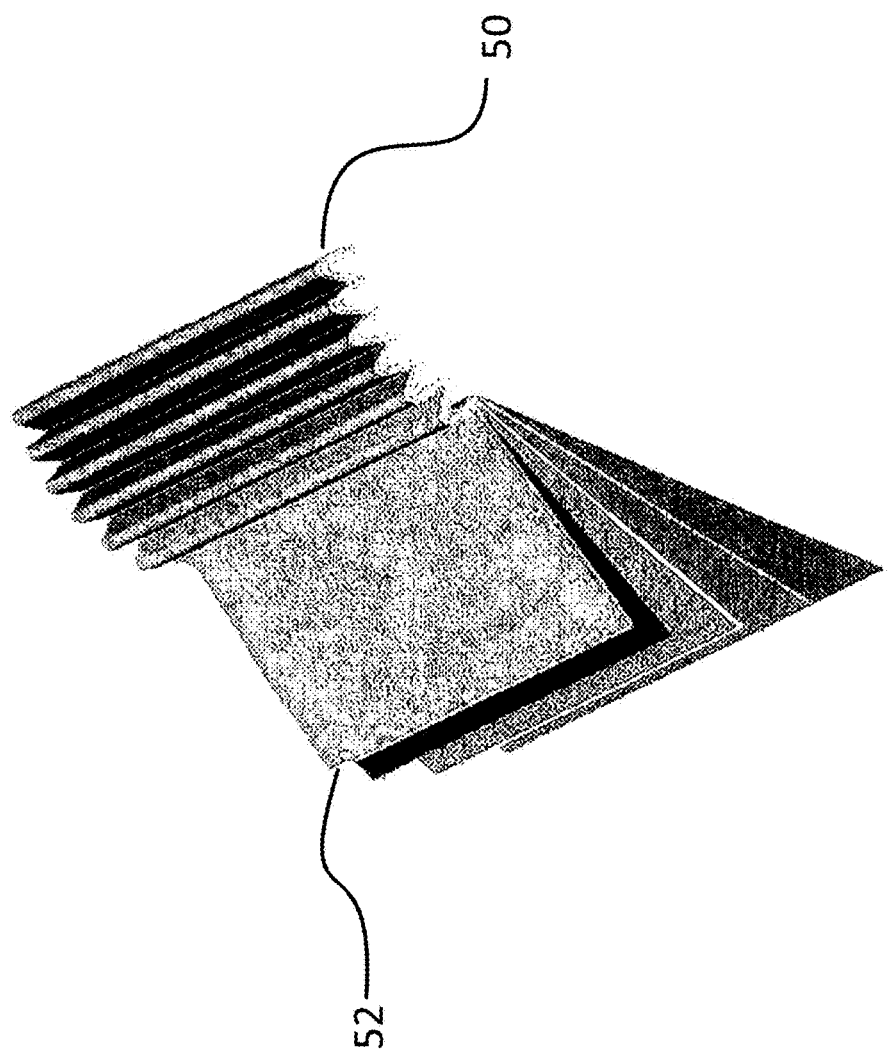
FIG. 6 illustrates a media pack layout of the filter element.

FIG. 6 illustrates the filter element 22 showing pleats 50 and multiple layers 52 and stages of filtration. The filter element 22 uses conventional filtration techniques to filter particulates in the air passing through the filter element 22 including impingement, interception, diffusion, and straining. The filter element 22 may be comprised of fiber having a size and spacing selected for the desired level of filtering.

In addition to the conventional filtering of particulates and aerosols, the layers of the filter element 22 are hydrophobic, either by way of a coating or the fibers themselves being hydrophobic. The filter element 22 filters water droplets in the air passing through the filter in a conventional manner like it does for particulates and aerosols. However, because the fibers are hydrophobic, the water droplets captured on the fibers are unable to wet the surface. The water droplets then combine to form water droplets of increasing size, eventually dropping from the filter element 22 and into the manifold 16.

Figure 7:
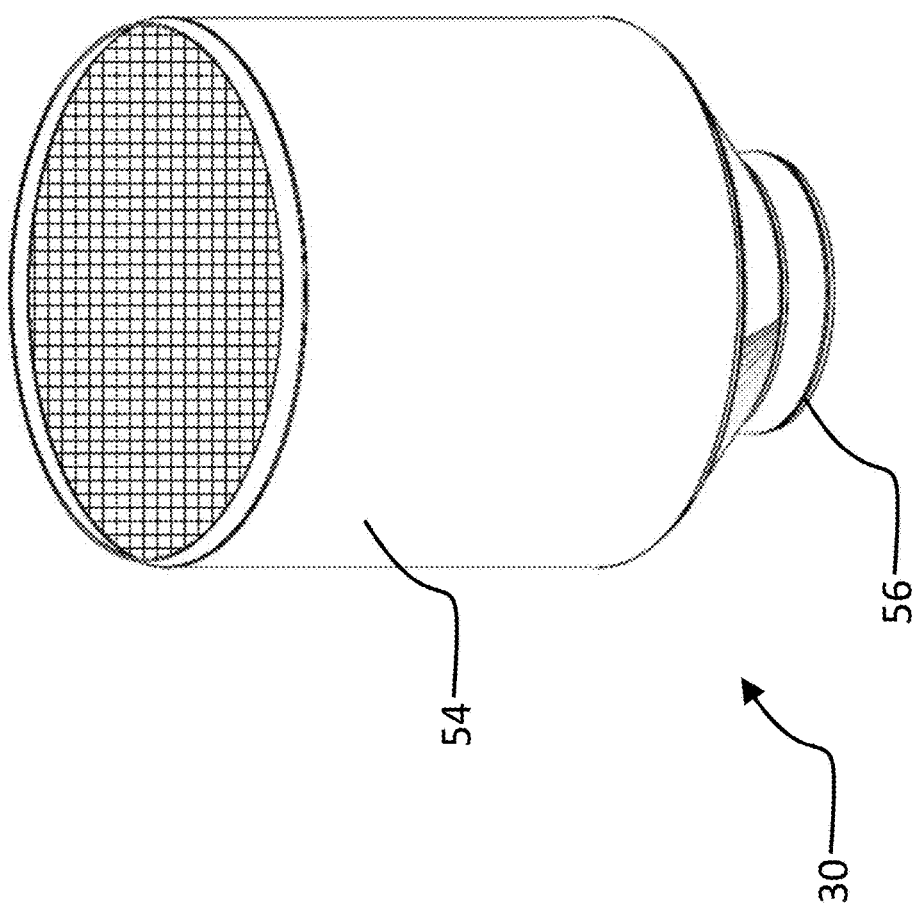
FIG. 7 illustrates a cleanable ozone converter for the air filtration system of FIG. 1.

FIG. 7 illustrates the cleanable ozone converter 30 separate from the remaining elements. The cleanable ozone converter 30 has passageways passing through the cleanable ozone converter 30 from an outer surface 54 to a converter outlet 56, such that air flows through the cleanable ozone converter 30 to reach the converter outlet 56. The passageways may be formed by an open cell structure, a porous structure of the cleanable ozone converter, rows of material having gaps there between, pellets having interstitial spaces between adjacent pellets, or other techniques as known to one of skill in the art. The passageways increase the surface area of the cleanable ozone converter 30 that interact with the air flowing through the cleanable ozone converter 30.

The cleanable ozone converter 30 contains a catalyst material such as platinum, platinum alloy, or other catalyst materials as known in the art. The catalyst material increases the rate at which ozone contained in the air flow decomposes and reacts with atmospheric oxygen. The passageways in the cleanable ozone converter 30 may be coated with the catalyst material rather than having a solid catalyst construction. For example, in one embodiment a corrosion resistant foil substrate coated with a slurry of platinum and iridium is used to form a honeycomb of passageways through the cleanable ozone converter 30. Such materials are compatible to most known contaminants in a climate controlled operating environment.

Figure 8:
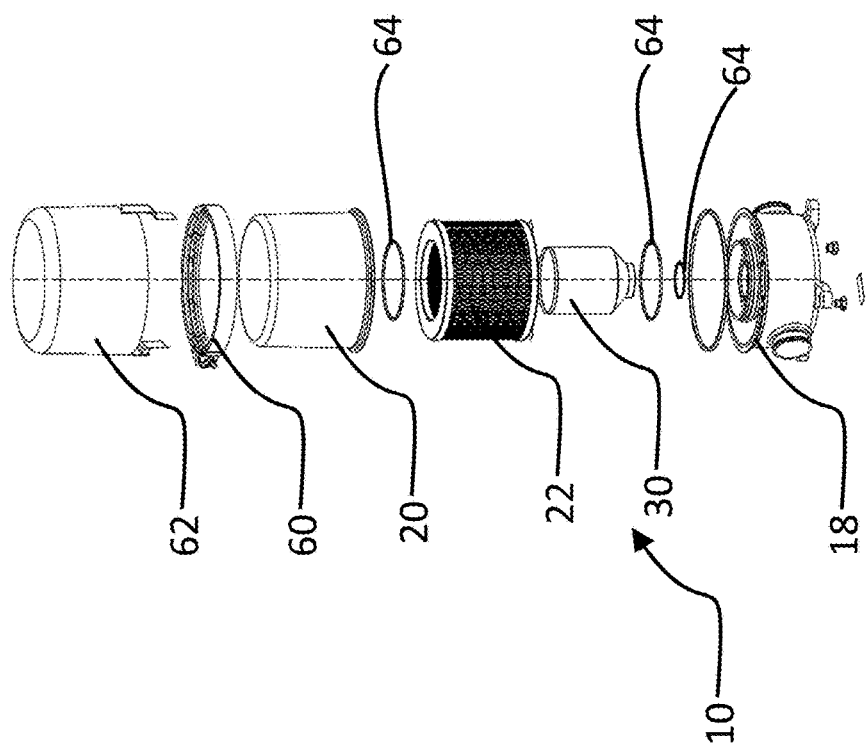
FIG. 8 illustrates an exploded view of the air filtration system of FIG. 1.

FIG. 8 illustrates the air filtration system 10 of FIG. 1 in an exploded view, showing the general assembly of the air filtration system 10. The manifold 18 is generally mounted to a secure surface using the protrusions 32, 34 at the base of the manifold. The filter bowl 20 is removable to allow access to the interior of the air filtration system 10. A V-band 60, or ring clamp secures the filter bowl 20 to the manifold 18 in a removable fashion. A removable insulation layer 62 may be placed over the filter bowl 20 for insulation. The insulation layer 62 has hook and loop fasteners for temporary attachment to the manifold 18 or bowl 20, allowing the insulation layer 62 to be easily removed for service. Other fasteners are possible such as snaps, button, zippers, and other means of temporary attachment.

The cleanable ozone converter 30 is housed on the inner flange of the manifold 18 with the filter element 22 surrounding the cleanable ozone converter 30; the filter element 22 being housed on the outer flange. Gaskets 64 may be placed between the filter bowl 20 and the manifold 18, the cleanable ozone converter 30 and the manifold 18, the filter bowl 20 and the filter element 22, and the manifold 18 and the filter element 22.

In use, liquid captured by the coalescing filter element 22 falls into the manifold 18 when the droplets grow to suitable size. Drain plugs in the bottom of the manifold 18 allow the liquid to drain out the bottom of the manifold 18. The drain plugs may be pressure sensitive, such that they only drain when a set inlet pressure is exceeded. For example, the drain plugs might be closed when the filtration system is not in use, but when air is directed to the inlet, the increase in pressure may cause the drain valves to open, draining any liquid in the manifold.

The described filtrations system allows for a compact, lightweight design for the filtration of air and removal of ozone. In some embodiments, the design allows a complete filter assembly to be less than fourteen inches in height and less than one foot in diameter, while weighing less than twenty pounds. Additionally, the filtration system may have a flow rate of between ten pounds per minute and thirty-two pounds per minute at one hundred fifty pounds per square inch of pressure.

It should be understood that the described embodiment is a preferred embodiment and various changes and modifications to the presently preferred embodiment described herein will be apparent to those skilled in the art. For example, the air filter may have a different shape than that shown such as a box or other shape. Additionally, while it is preferred that the outlet be coupled to the cleanable ozone converter near the center of the manifold, in some embodiments the outlet could be positioned differently.

We claim:

1. A filter assembly comprising:
   a housing comprising a manifold having an inlet and an outlet; and a filter bowl removably coupled to the manifold;
   a particulate/coalescing element disposed in the housing, the particulate/coalescing comprising a hydrophobic filtration media;
   a cleanable ozone converter disposed in the housing, the cleanable ozone converter comprising a passageway have a catalytic interface surface; and
   wherein the filter assembly has a flow path through the housing that includes flowing through the particulate/coalescing element and then through the cleanable ozone converter before exiting the housing,
   wherein the manifold has an inner flange sized to receive the cleanable ozone converter and an outer flange sized to receive the particulate/coalescing element,
   wherein the housing, the particulate/coalescing element, and the cleanable ozone converter are electrically bonded.

2. The filter assembly of claim 1, wherein the housing is cylindrical.

3. The filter assembly of claim 1, wherein the flow path flows from the manifold inlet into the particulate/coalescing element and from the cleanable ozone converter into the manifold outlet.

4. The filter assembly of claim 1, further comprising a drain plug in a bottom of the manifold.

5. The filter assembly of claim 1, wherein the manifold outlet extends to a central location of the manifold.

6. The filter assembly of claim 1, wherein a V-band secures the filter bowl to the manifold.

7. A filter assembly comprising:
   a housing comprising a manifold having an inlet and an outlet; and a filter bowl removably coupled to the manifold;
   a particulate/coalescing element disposed in the housing, the particulate/coalescing comprising a hydrophobic filtration media;
   a cleanable ozone converter disposed in the housing, the cleanable ozone converter comprising a passageway have a catalytic interface surface; and
   wherein the filter assembly has a flow path through the housing that includes flowing through the particulate/coalescing element and then through the cleanable ozone converter before exiting the housing,
   wherein the housing, the particulate/coalescing element, and the cleanable ozone converter are electrically bonded.

8. The filter assembly of claim 7, wherein the manifold has an inner flange sized to receive the cleanable ozone converter and an outer flange sized to receive the particulate/coalescing element.

9. The filter assembly of claim 7, further comprising an annular space which is defined by an interior surface of the filter bowl and an exterior surface of the particulate/coalescing element.

10. The filter assembly of claim 7, wherein the manifold comprises protrusions at a base end having holes for mounting the manifold.

11. The filter assembly of claim 7, wherein the manifold is circular in shape and has a centrally located ring configured to receive the cleanable ozone converter and the particulate/coalescing element.

12. A method of filtering air, comprising:
    supplying air into an inlet an air filtration system, the air filtration system comprising:
       a housing comprising a manifold having the inlet and an outlet; and a filter bowl removably coupled to the manifold;
       a particulate/coalescing element disposed in the housing, the particulate/coalescing comprising a hydrophobic filtration media;
       a cleanable ozone converter disposed in the housing, the cleanable ozone converter comprising a passageway have a catalytic interface surface; and
       wherein the filter assembly has a flow path through the housing that includes flowing through the particulate/coalescing element and then through the cleanable ozone converter before exiting the housing,
       wherein the manifold has an inner flange sized to receive the cleanable ozone converter and an outer flange sized to receive the particulate/coalescing element,
       wherein the housing, the particulate/coalescing element, and the cleanable ozone converter are electrically bonded,
    directing the air into the filter bowl;
    passing the air through the particulate/coalescing element; and
    passing the air through the cleanable ozone converter after the air passes through the particulate/coalescing element.

13. The method of claim 12, wherein the air is supplied at a pressure of 150 psi.

14. The method of claim 12, further comprising an annular space which is defined by an interior surface of the filter bowl and an exterior surface of the particulate/coalescing element.

15. The method of claim 12, wherein the manifold comprises protrusions at a base end having holes for mounting the manifold.

16. The method of claim 12, wherein the manifold is circular in shape and has a centrally located ring configured to receive the cleanable ozone converter and the particulate/coalescing element.

17. The method of claim 16, wherein the centrally located ring comprises an inner flange configured to receive a base of the cleanable ozone converter, and an outer flange configured to receive a base of the particulate/coalescing element.

* * * * *